United States Patent
Lee et al.

(10) Patent No.: US 7,272,380 B2
(45) Date of Patent: Sep. 18, 2007

(54) USER AUTHENTICATION METHOD AND APPARATUS

(75) Inventors: Jong-ha Lee, Gyeonggi-do (KR); Eui-hyeon Hwang, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 520 days.

(21) Appl. No.: 10/760,555

(22) Filed: Jan. 21, 2004

(65) Prior Publication Data

US 2004/0219902 A1    Nov. 4, 2004

(30) Foreign Application Priority Data

Jan. 21, 2003   (KR) .................. 10-2003-0004104

(51) Int. Cl.
*H04M 3/16* (2006.01)
(52) U.S. Cl. ..................... 455/410; 455/411
(58) Field of Classification Search ............... 455/410, 455/411, 414.1; 340/5.82, 5.85, 5.81, 5.52
See application file for complete search history.

(56) References Cited

U.S. PATENT DOCUMENTS

| | | | | |
|---|---|---|---|---|
| 5,930,804 | A * | 7/1999 | Yu et al. ............... | 707/104.1 |
| 6,035,406 | A | 3/2000 | Moussa et al. | |
| 6,145,083 | A * | 11/2000 | Shaffer et al. ............. | 726/7 |
| 6,256,737 | B1 * | 7/2001 | Bianco et al. ............ | 713/186 |
| 6,990,684 | B2 * | 1/2006 | Futamura et al. .......... | 726/18 |
| 2001/0036297 | A1 | 11/2001 | Ikegami et al. | |
| 2003/0115473 | A1 * | 6/2003 | Sugimura et al. ......... | 713/186 |
| 2004/0164848 | A1 * | 8/2004 | Hwang et al. ........... | 340/5.82 |

FOREIGN PATENT DOCUMENTS

| | | |
|---|---|---|
| JP | 11-345206 | 12/1999 |
| KR | 2000-24587 | 5/2000 |
| KR | 2001-7874 | 2/2001 |
| KR | 2001-8753 | 2/2001 |
| KR | 2001-20103 | 3/2001 |
| KR | 2001-0054623 A | 7/2001 |

(Continued)

OTHER PUBLICATIONS

European Search Report dated Jan. 2, 2006 for Application No. 04250299.7-2224.

(Continued)

*Primary Examiner*—CongVan Tran
(74) *Attorney, Agent, or Firm*—Staas & Halsey LLP

(57) ABSTRACT

A user authentication method includes varying a threshold value for human body recognition depending on the extent to which an input graphical password matches with a registered graphical password and determining whether to authenticate a user or not based on a result of comparing the user's human body recognition information with registered human body recognition information. Thus, it is possible to improve convenience, reliability, and security of user authentication based on a graphical password in a device, such as a PDA or other portable electronic device, not having a key manipulation unit. In addition, a biometrics unit that used to provide authentication functions and to carry out user authentication may be improved by lowering both FAR and FRR by variably setting a threshold value for biometrics depending on the result of user authentication using a graphical password.

53 Claims, 5 Drawing Sheets

FOREIGN PATENT DOCUMENTS

| | | |
|---|---|---|
| KR | 2001-64869 | 7/2001 |
| KR | 2001-73910 | 8/2001 |
| KR | 2001-95788 | 11/2001 |
| KR | 2002-75530 | 10/2002 |
| WO | WO 01/71461 | 9/2001 |

OTHER PUBLICATIONS

Korean Office Action issued on Oct. 27, 2004 (4 pages), with respect to Korean Patent Application No. 10-2003-0004104 and English translation.

* cited by examiner

USER AUTHENTICATION METHOD AND APPARATUS

This application claims the priority of Korean Patent Application No. 2003-4104, filed on Jan. 21, 2003, in the Korean Intellectual Property Office, the disclosure of which is incorporated herein in its entirety by reference.

BACKGROUND OF THE INVENTION

1. Field of the Invention

The present invention relates to user authentication, and more particularly, to user authentication using a graphical password or through biometrics.

2. Description of the Related Art

Conventional password-based user authentication techniques are as follows.

First, Korean Patent Application No.1999-56333 entitled "Personal Identification Number (PIN) Code System" discloses a PIN code system into which a user can input a PIN code using a key pad means provided to a security alarming apparatus, a safe, an exit/entrance gate, a PC, or an ATM. The PIN code system generally supports functions that are usually provided by using PIN codes and also enables secret commands to be executed by the PIN codes by making up a PIN of a combination of a real number and an imaginary number so that the real number constitutes a meaningful portion of the PIN and the imaginary number constitutes a meaningless portion of the PIN and inserting a specific secret command signal into the imaginary number.

Second, Korean Patent Application No. 1999-59247 discloses a method of setting or canceling a lock function for a mobile wireless phone, which involves a first process of sensing whether an associate expression input function has been selected, inputting an expression associated with a previously stored PIN, and storing the associate expression in memory and a second process of displaying a request for inputting a PIN on a screen if it is sensed that the mobile wireless phone has been turned on after being turned off in lock mode, determining whether or not the input PIN matches with the previously stored PIN, and displaying the associate expression on the screen if a wrong PIN has been input a predetermined number of times or more.

Third, Korean Patent Application No. 2000-8580 discloses a system and method for inputting a PIN on the Internet in which a user can input a PIN on the Internet by clicking a predetermined area of a picture displayed on a screen.

U.S. Pat. No. 5,559,961 entitled "Graphical Password" discloses a means for inputting a password by touching a specific portion of a picture. This means can be used as a keypad by setting a tap region on the picture.

Conventional user authentication methods based on a combination of a password and biometrics are as follows.

First, Korean Patent Application No. 2000-19152 entitled "Portable Security Authentication Apparatus and Operating Method Thereof" discloses a method of authenticating a user through biometrics such as a fingerprint or voice or through authentication of a sequential combination of passwords.

Second, Korean Patent Application No. 2000-3099 entitled "Door Lock/Unlock System Adopting Combination of Fingerprint Recognition and Password Authentication and Method of Controlling the Same" discloses a user authentication technique in which a user whose fingerprint cannot be registered and a visitor whose fingerprint has not yet been registered can be authenticated by inputting a password.

Third, Korean Patent Application No. 2000-60312 entitled "Entrance/Exit Control System and Method Adopting Fingerprint and Face Recognition" discloses a user authentication technique in which a user can be authenticated through a combination of fingerprint and face recognition or through a combination of password authentication and fingerprint and face recognition. In this user authentication technique, security can be enhanced by storing a fingerprint and face image of an unauthenticated person.

Finally, Korean Patent Application Nos. 2001-15559 and 1999-26726 disclose a door opening and shutting system based on fingerprint recognition and a method of recognizing a password of a mobile phone through voice recognition, respectively.

The above conventional user authentication techniques carry out a plurality of user authentication processes simply based on a combination of password authentication and biometrics or a combination of security key authentication and biometrics.

A conventional biometrics device that authenticates a user using, for example, a face, a fingerprint, or an iris, as an authentication key may have performance degradation because the authentication key is likely to be input into the conventional biometrics device differently all the time depending on where and how a user uses the conventional biometrics device, or because the authentication key is also likely to vary itself according to the passage of time. In addition, since a threshold value for biometrics device is variably set, in some cases, a registered person may not be authenticated while a non-registered person may be authenticated instead.

Recently, the number of people using a device into which they can input commands via a graphical user interface, such as a personal digital assistant (PDA), has been continuously increasing. Therefore, what really matters in user authentication in a PDA based on a graphical password is whether convenience, reliability, and security of user authentication can be guaranteed.

In addition, it is important to improve the inherent imperfect nature of conventional biometrics devices by organically combining graphical password authentication and biometrics into a more efficient user authentication process.

SUMMARY OF THE INVENTION

The present invention provides a user authentication method based on a graphical password.

The present invention also provides a user authentication method based on a combination of a graphical password and biometrics.

The present invention also provides a user authentication apparatus that performs the user authentication method based on a graphical password.

The present invention also provides a user authentication apparatus that performs the user authentication method based on a combination of a graphical password and biometrics.

According to an aspect of the present invention, a user authentication method authenticates a user based on a graphical password input by the user via a graphical user interface on a screen of a terminal. The user authentication method involves determining whether or not the graphical password has been input; determining whether to authenticate the user or not depending on whether or not the extent to which a location of the input graphical password matches with a reference location of a registered graphical password is within an authentication margin for a location of any input graphical password with respect to the reference location of the registered graphical password; storing a graphical password input history if the user is not authenticated; determining whether or not there has been an intrusion by referring to the graphical password input history; and reducing the authentication margin upon determining there has been an intrusion.

Additional aspects and/or advantages of the invention will be set forth in part in the description which follows and, in part, will be obvious from the description, or may be learned by practice of the invention.

According to another aspect of the present invention, a user authentication method authenticates a user based on biometrics information and a graphical password input by the user via a graphic user interface on a screen of a terminal. The user authentication method involves determining whether or not the graphical password has been input; variably setting a threshold value for biometrics depending on the extent to which the input graphical password matches with a registered graphical password; and determining whether to authenticate the user or not based on a result of comparing the user's biometrics information input with registered biometrics and repeating the user authentication operations if the user is not authenticated.

According to still another aspect of the present invention, a user authentication apparatus authenticates a user based on a graphical password input by the user via a graphical user interface on a screen of a terminal. The user authentication apparatus includes a graphical password input unit which determines whether or not the graphical password has been input; a control unit which determines whether to authenticate the user, depending on whether the extent to which a location of the input graphical password matches with a reference location of a registered graphical password is within an authentication margin for a location of any input graphical password with respect to the reference location of the registered graphical password; a storage unit which stores the registered graphical password and stores a graphical password input history if the user is not authenticated; and a graphical password input history analysis unit which determines whether there has been an intrusion by referring to the graphical password input history. Here, the control unit reduces an authentication margin for a location of any input graphical password with respect to the reference location of the registered graphical password if the graphical password input history analysis unit determines that there has been an intrusion.

According to another aspect of the present invention, a user authentication apparatus authenticates a user based on biometrics information and a graphical password input by the user via a graphic user interface on a screen of a terminal. The user authentication apparatus includes a graphical password input unit which determines whether or not the graphical password has been input; a storage unit which stores registered graphical password and registered biometrics information; a control unit which variably sets a threshold value for biometrics depending on the extent to which the input graphical password matches with a registered graphical password; and a biometrics unit which determines whether to authenticate the user or not based on a result of comparing the user's, biometrics information input with registered biometrics.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
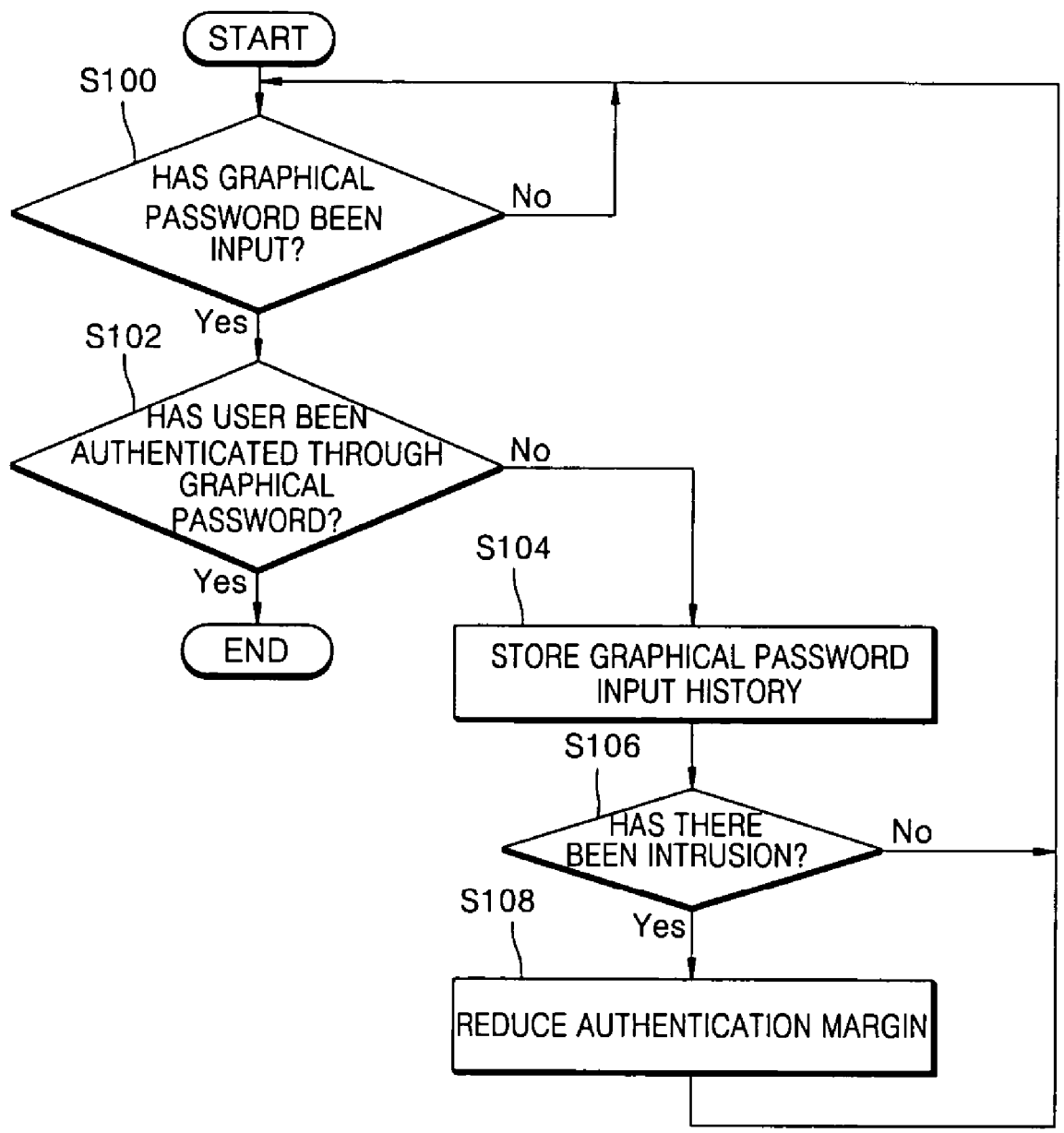
FIG. 1 is a flowchart of a user authentication method based on graphical passwords according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

The present invention relates to a user authentication method based on a graphical password input via a graphical user interface on a screen of a personal digital assistant (PDA) or based on biometrics. It is understood that other portable electronic devices with display screens may also be used with the present invention.

FIG. 1 is a flowchart of a user authentication method based on a graphical password according to an embodiment of the present invention. Referring to FIG. 1, the user authentication method involves receiving a graphical password in operation S100, authenticating a user in operation S102, storing a graphical password input history in operation S104, determining whether or not there has been an intrusion by referring to the graphical password input history in operation S106, and reducing an authentication margin for an intruder in operation S108.

In operation S100, the method continuously cycles until a graphical password has been input by a user.

In operation S102, if a graphical password has been received, the user is authenticated based on the extent to which a location of the received graphical password matches with a reference location of a registered graphical password. In addition, in a case where a combination of two or more graphical passwords is used for authenticating the user, it may possibly be determined in operation S102 whether to authenticate the user or not based on the extent to which the order of the input graphical passwords matches with a desired order of registered graphical passwords.

The reference location of the registered graphical password could be a predetermined area, for example. Therefore, if a graphical password is input within the predetermined area, then the input graphical password matches with the registered graphical password and the user may be authenticated.

In operation S104, if the user is not authenticated, a graphical password input history is stored.

In operation S106, an intrusion is detected by referring to the graphical password input history. For example, if graphical passwords have been input in a wrong order n times or more or if a graphical password has been input beyond an authentication margin n times or more, an intrusion has been detected. If the graphical password is input beyond a predetermined distance from the reference location of the registered graphical password, an intrusion has been detected.

If there has been an intrusion, an authentication margin for a location of any input graphical password with respect to the reference location of the registered graphical password is reduced in operation S108.

The user authentication method of FIG. 1 could further involve restoring the reduced authentication margin to the initial predetermined setting after operation S108 if the determination that there has been an intrusion has expired or been cancelled based on analyzing the graphical password input history. In addition, even though the user is not authenticated in operation S102, the determination that there has been an intrusion can be cancelled if a graphical password has been input within the predetermined distance from the reference location of the registered graphical password m times or more in a row, in which case the reduced authentication margin can be restored.

In addition, in order to facilitate the user's inputting a graphical password, the user authentication method of FIG. 1 may include displaying a background picture.

Figure 2:
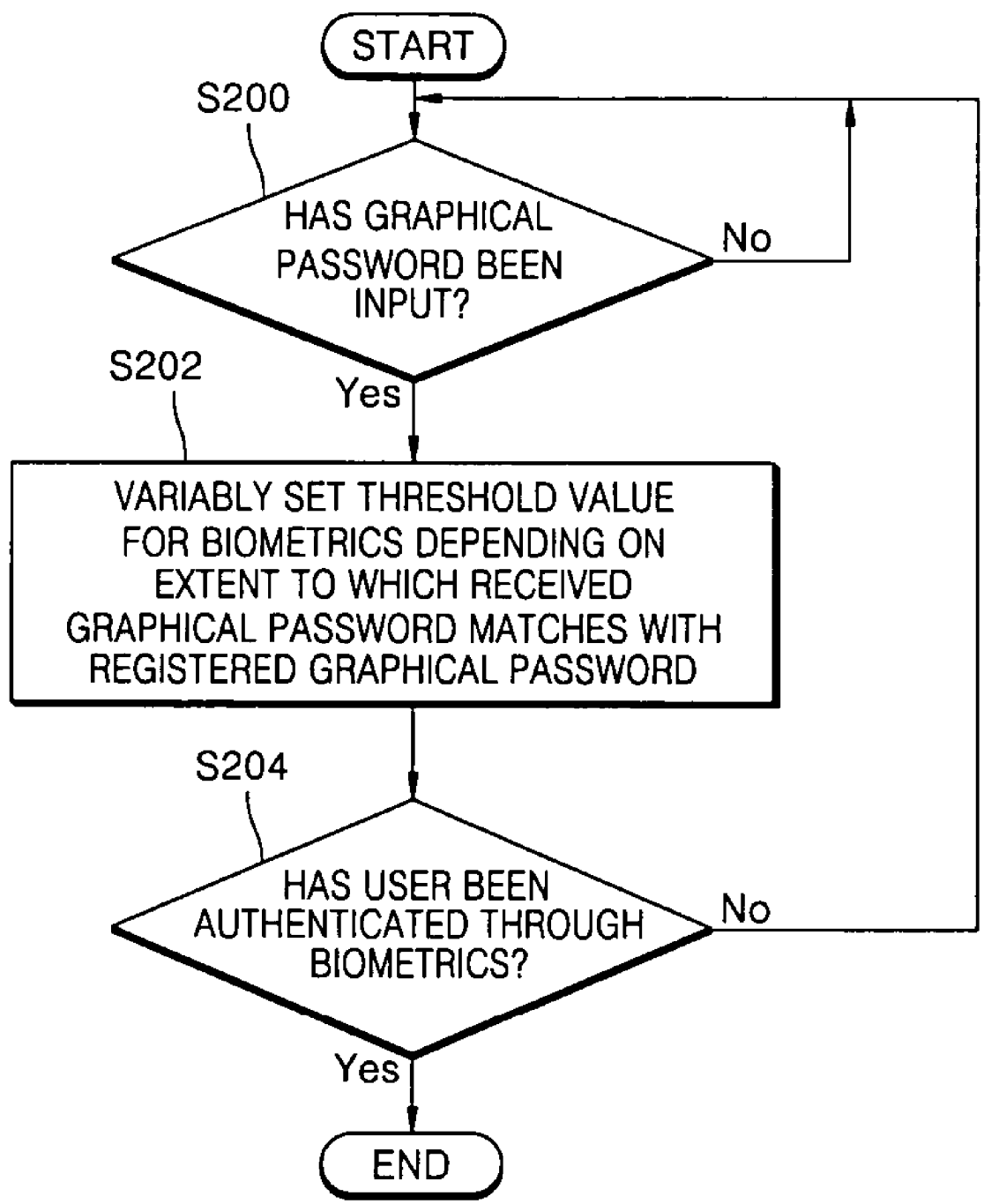
FIG. 2 is a flowchart of a user authentication method based on a combination of a graphical password and biometrics according to an embodiment of the present invention.

FIG. 2 is a flowchart of a user authentication method based on a graphical password and biometrics information according to an embodiment of the present invention. The user authentication method includes receiving a graphical password in operation S200, varying a threshold value for biometrics depending on the extent to which the received graphical password matches with a registered graphical password in operation S202, and determining whether to authenticate a user or not through biometrics in operation S204.

Unlike the user authentication method of FIG. 1 which is based on a graphical password, the user authentication method of FIG. 2 takes advantage of biometrics information as well as a graphical password.

Operation S200 checks if a graphical password has been input by a user.

If a graphical password has been received, a threshold biometric value is set depending on the extent to which the received graphical password matches with a registered graphical password in operation S202. Here, the extent to which the received graphical password matches with the registered graphical password is determined based on the proximity of a location of the received graphical password to a reference location of the registered graphical password. For example, the reference location of the registered graphical password could be a predetermined area. If a graphical password is input directly into the predetermined area, the input graphical password is determined to match the registered graphical password. In addition, if two or more graphical passwords are adopted for authenticating the user, the input order of the graphical passwords must also match a predetermined order.

Even when the received graphical password is not an exact match to the registered graphical password, the method proceeds to operation S202 if the input graphical password is within a predetermined threshold. In operation S202, the threshold value for biometrics can be varied depending on the extent to which the received graphical password matches with the registered graphical password. If the extent to which the received graphical password matches with the registered graphical password increases, the threshold value is adjusted so that a false rejection rate (FRR) can be reduced. If the extent to which the received graphical password matches with the registered graphical password decreases, the threshold value is adjusted so that a false acceptance rate (FAR) can be smaller.

An example of the method of varying the threshold value for biometrics depending on the extent to which the received graphical password matches with the registered graphical password will be described in the following paragraphs.

The threshold value for biometrics based on the extent to which the received graphical password matches with the registered graphical password can be expressed by a function t(k) calculated by Equation (1) below.

$$t(x) = t_0 + c|x-x_0|^n \tag{1}$$

In Equation (1), $x_0$, $|x-x_0|$, $t_0$, and c represent the reference location of the registered graphical password, the extent to which the received graphical password matches with the registered graphical password, a reference threshold value, and a predetermined weight value, respectively. When $t_0 = -0.72$, $n=2$, and $c=7.5 \times 10^{-5}$, different threshold values and their corresponding FAR (%) and FRR (%) are shown in Table (1) below.

TABLE (1)

| Threshold value | FAR (%) | FRR (%) |
|---|---|---|
| ... | ... | ... |
| −0.68 | 1.028 | 7.361 |
| −0.69 | 1.119 | 6.667 |
| −0.70 | 1.234 | 6.389 |
| −0.71 | 1.341 | 6.389 |
| −0.72 | 1.488 | 6.250 |
| −0.73 | 1.599 | 6.111 |
| −0.74 | 1.750 | 6.111 |
| −0.75 | 1.913 | 5.972 |
| ... | ... | ... |

In operation S202, a determination is made whether to authenticate a user, depending on whether a desired graphical password has been received in a desired manner, and the user authentication process through biometrics can be carried out only when the received graphical password matches with the registered graphical password. If the user is authenticated based on the graphical password input by himself/herself, the threshold value for biometrics can be varied depending on the extent to which the input graphical password matches with the registered graphical password. As the extent to which the input graphical password matches with the registered graphical password increases, the threshold value is adjusted so that a false rejection rate (FRR) can be reduced. On the other hand, as the extent to which the input graphical password matches with the registered graphical password decreases, the threshold value is adjusted so that a false acceptance rate (FAR) can be smaller.

In operation S204, the input user's biometrics information is compared with registered biometrics information, and whether the user is authenticated is based on a result of the comparison. If the user is not authenticated, the method returns to operation S200.

Figure 3:
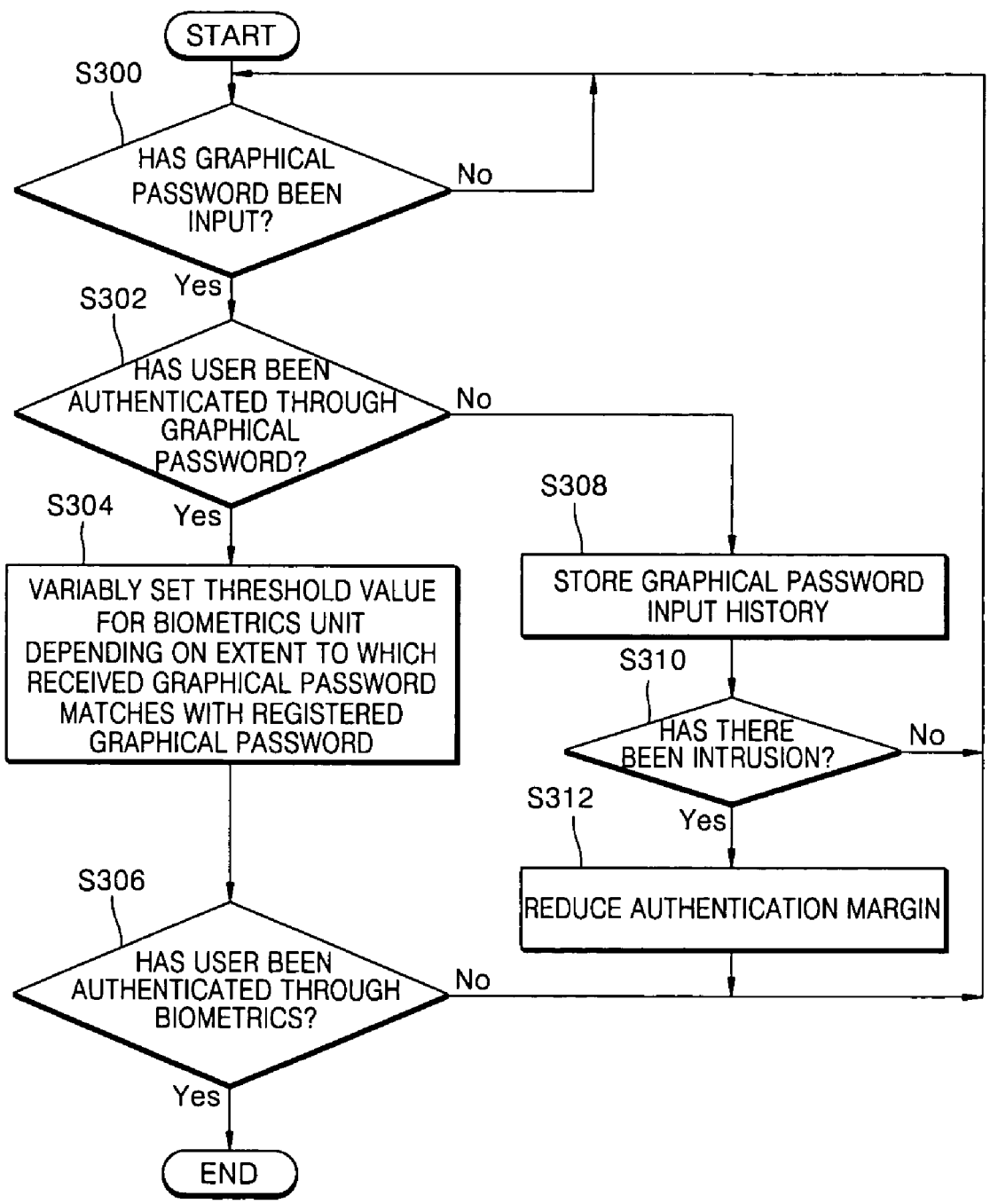
FIG. 3 is a flowchart of a user authentication method based on a combination of a graphical password and biometrics according to an embodiment of the present invention.

FIG. 3 is a flowchart of a user authentication method based on a graphical password and biometrics information according to an embodiment of the present invention. The user authentication method of FIG. 3 involves operations S300 through S306 where user authentication based on biometrics is carried out only when a user is authenticated by a graphical password.

In operation S300, a graphical password is received. In operation S302, a determination is made whether to authenticate a user depending on whether the extent to which a location of the received graphical password matches with a reference location of a registered graphical password is within an authentication margin. In a case where the received graphical password comprises two or more input signals, operation S302 may also include determining whether to authenticate the user depending on whether the input signals are input in a desired order. Here, for example, the reference location of the registered graphical password could be a predetermined area. If a graphical password is input into the predetermined area, the received graphical password is determined as matching with the registered graphical password.

In a case where the user is not authenticated by a graphical password, the user authentication method of FIG. 3 includes operations S308 through S312.

More specifically, if the user is not authenticated by a graphical password, a graphical password input history is stored in operation S308. Thereafter, in operation S310, it is determined whether there has been an intrusion by referring to the graphical password input history. For example, if the number of times components of a graphical password have been input in a wrong order or beyond the authentication margin is greater than n, the result is an intrusion detection. If the graphical password received in operation S300 is input beyond a predetermined distance from the reference location of the registered graphical password, an intrusion detection may be output irrespective of how many attempts to input the graphical password there have been. In a case where the predetermined area is set as the reference location of the registered graphical password, when a graphical password is input beyond a predetermined distance from the predetermined area an intrusion has been detected. If there has been an intrusion, the authentication margin for the location of the received graphical password with respect to the reference location of the registered graphical password is reduced in operation S312.

The user authentication method of FIG. 3 may further include restoring the reduced authentication margin if the determination that there has been an intrusion is determined as being reversible by analyzing the graphical password input history. For example, if a graphical password is input within the authentication margin m times or more in a row, the determination that there has been an intrusion is cancelled, and the reduced authentication margin is restored to the initial setting. In addition, in order to facilitate a user's inputting a graphical password, the user authentication method of FIG. 3 may also include displaying a background picture.

Figure 4:
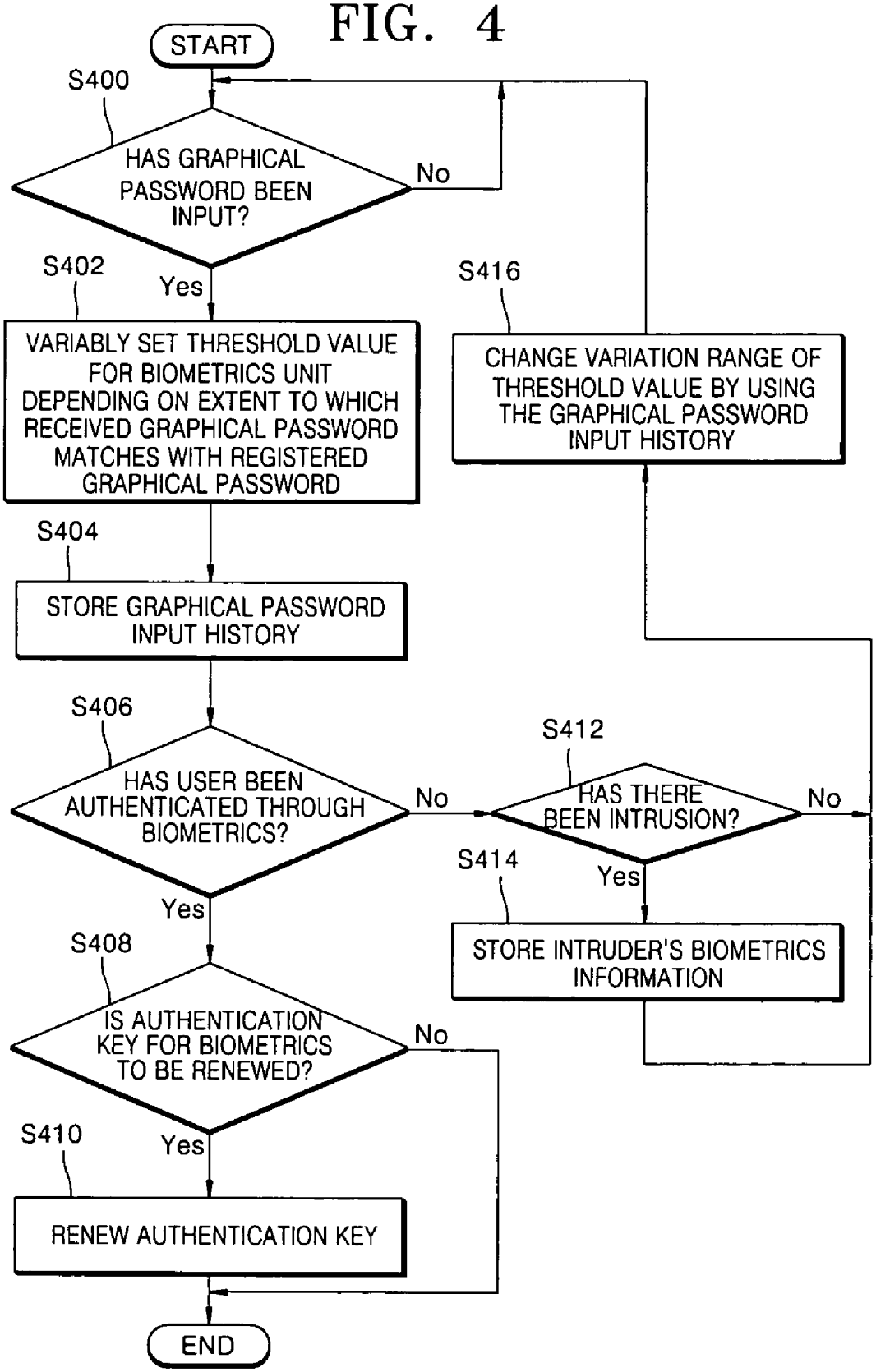
FIG. 4 is a flowchart of a user authentication method based on a combination of a graphical password and biometrics according to an embodiment of the present invention.

FIG. 4 is a flowchart of a user authentication method based on a graphical password and biometrics information according to another embodiment of the present invention. The user authentication method includes operations S400 through S416 where an intrusion is detected by referring to a graphical password input history and a threshold value for biometrics is varied based on the intrusion detection operation. Operations S400 and S402 are the same as operations S200 and S202 of FIG. 2.

After operation S402, the graphical password input history is stored in operation S404.

Thereafter, whether a user is authenticated through biometrics is determined in operation S406.

If the user is not authenticated, the entire user authentication process is completed. Otherwise, a determination is made whether there has been an intrusion by referring to the graphical password input history in operation S412 and the user authentication method returns to operation S400 if there has not been an intrusion. Here, before returning to operation S400, the user authentication method selectively includes changing the variation range of the threshold value by using the graphical password input history (operation S416). For example, in operation S416, the variation range of the threshold value can be changed to improve security if an incorrect graphical password has been input n times or more. In operation S402, the threshold value for biometrics varies within a predetermined range depending on the extent to which an input graphical password matches with a registered graphical password. More specifically, the variation range of the threshold value for biometrics can be changed by respectively adjusting $t_0$, c and n of Equation (1). In addition, in operation S416, the level of security can be enhanced by using a threshold value determining function other than the one defined in Equation (1).

Moreover, if a desired graphical password has been input correctly n times or more in a row since the variation range of the threshold value was adjusted to enhance the level of security, the user authentication method may further include restoring the variation range of the threshold value (operation S416) to an initial setting.

When an intrusion is detected in operation S412 the user authentication method may further include operation S414 where biometrics information of an intruder is stored. In this case, the user authentication method involves comparing an input biometrics information value with the stored biometrics information of the intruder and then authenticating the user based on a result of the comparison (in operation S406).

If the user is authenticated through biometrics in operation S406, an authentication key is added or updated (renewed) in operations S408 and S410. More specifically, it is determined in operation S408 whether to update the authentication key for biometrics. When the authentication key is to be renewed, the authentication key is updated in operation S410. In operation 408, the authentication key may be added or updated only when the graphical password input by the user matches with the registered graphical password and the user is authenticated through biometrics. Alternatively, in operation S408, the authentication key could be added or updated only when the user is authenticated through biometrics and the extent to which the biometrics information input by the user matches with the registered biometrics information exceeds a predetermined threshold value.

Figure 5:
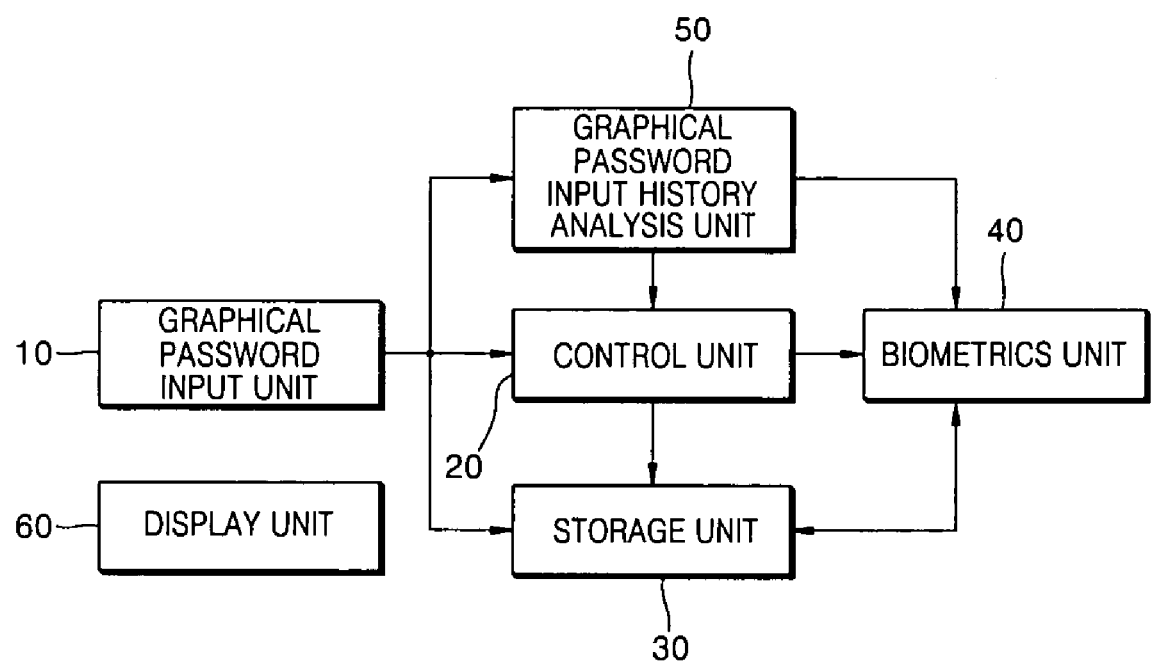
FIG. 5 is a block diagram of a user authentication apparatus according to a preferred embodiment of the present invention that performs a user authentication method according to an embodiment of the present invention.

FIG. 5 is a block diagram of a user authentication apparatus that performs a user authentication method according to an embodiment of the present invention. Referring to FIG. 5, the user authentication method includes a graphical password input unit 10, a control unit 20, a storage unit 30, a biometrics unit 40, a graphical password input history analysis unit 50, and a display unit 60. The operation of the elements of the user authentication apparatus of FIG. 5 will be described in greater detail in the following paragraphs with reference to the user authentication method of FIG. 4.

In operation S400, the graphical password input unit 10, in cooperation with a screen of a mobile terminal, enables a user to input a graphical password into the user authentication apparatus.

The display unit 60, which corresponds to a display screen of the mobile terminal, realizes a graphical user interface and displays a background picture.

In operation S402, the control unit 20 variably sets a threshold value for biometrics based on the extent to which the graphical password input by the user matches with a registered graphical password. In operation S416, the control unit 20 adjusts a variation range of the threshold value for biometrics based on a result of the graphical password input history analysis unit 50 analyzing a graphical password input history. In operation S408, the control unit 20 determines whether to update an authentication key for biometrics. In operation S412, the control unit 20 determines whether or not there has been an intrusion based on a result of the analysis provided by the graphical password input history analysis unit 50.

The storage unit 30 stores a registered graphical password and a registered authentication key for biometrics. A fingerprint, an iris, or a face may be used as an authentication key for biometrics. In operation S414, the storage unit 30 stores an intruder's biometrics information that has been input into the biometrics unit 40 in response to a command issued by the control unit 20. In operation S410, the storage unit 30 adds/renews and stores an authentication key in response to a command issued by the control unit 20.

In operations 406 and S412, the graphical password input history analysis unit 50 stores and analyzes a graphical password input history.

In operation S406, the biometrics unit 40 obtains a user's biometrics information, determines whether the obtained biometrics information matches with the registered biometrics information by comparing the obtained biometrics information with the registered biometrics, and authenticates the user if the extent to which the obtained biometrics information matches with the registered biometrics information is larger than a predetermined threshold value.

Hereinafter, the operation and structure of user authentication apparatuses that perform the user authentication methods of FIGS. 1 through 4, respectively, will be described in greater detail with reference to FIG. 5.

A user authentication apparatus that performs the user authentication method of FIG. 1 includes a graphical password input unit 10, a control unit 20, a storage unit 30, a graphical password input history analysis unit 50, and a display unit 60. The user authentication apparatus authenticates a user based on a graphical password input by the user via a graphical user interface on a screen of a terminal.

In operation S100, the graphical password input unit 10 determines whether or not a graphical password has been received. If a graphical password has been received, the control unit 20 determines whether to authenticate a user depending on whether the extent to which a location of the received graphical password matches with a reference location of a registered graphical password is within a predetermined authentication margin in operation S102. Here, the reference location of the registered graphical password could be a predetermined area as well as a point. In addition, if at least two graphical passwords are used for authenticating the user, the control unit 20 may determine whether to authenticate the user depending on whether the graphical passwords have been input in a predetermined order.

In operation S104, the storage unit 30, which also stores the registered graphical password, stores a graphical password input history in operation S104 if the user is not authenticated.

In operation S106, the graphical password input history analysis unit 50 determines whether there has been an intrusion using the graphical password input history stored in the storage unit 30. When an intrusion is detected, the control unit 20 reduces an authentication margin for a location of any input graphical password with respect to a reference location of the registered graphical password in operation S108. The graphical password input history analysis unit 50 can determine that there has been an intrusion when a graphical input password is input beyond a predetermined distance from the reference location of the registered graphical password. In addition, in a case where the determination that there has been an intrusion is determined as being cancellable based on the graphical password input history, the control unit 20 resets the reduced authentication margin to the initial setting.

The display unit 60 displays a background picture on the screen of the terminal. The background picture displayed by the display unit 60 helps a user to locate a place where a graphical password is desired to be input.

User authentication apparatuses according to present invention that carry out the user authentication methods of FIGS. 2 through 4, respectively, each includes a graphical password input unit 10, a control unit 20, a storage unit 30, a biometrics unit 40, a graphical password input history analysis unit 50, and a display unit 60 in order to authenticate a user based on a graphical password input by the user via a graphical user interface on a screen of a terminal and based on the user's biometrics information.

In operations S200 and S300, the graphical password input unit 10 determines whether a graphical password has been received.

In operations S202 or S304, the control unit 20 sets a threshold value for biometrics depending on the extent to which the received graphical password matches with a registered graphical password.

The storage unit 30 stores the registered graphical password and registered biometrics information.

In operation S204, the biometrics unit 40 determines whether to authenticate the user based on the extent to which the user's biometrics information matches with the registered biometrics information by comparing the user's biometrics information with the registered biometrics information.

The control unit 20 is realized so that it can determine in operation S302 whether to authenticate the user depending on the extent to which the received graphical password matches with a registered graphical password.

In addition, the control unit 20 can variably set the threshold value for biometrics in operation S304 or S402 depending on the extent to which the received graphical password matches with a registered graphical password.

In addition, the control unit 20 determines whether to authenticate the user depending on whether the extent to which a location of the received graphical password matches with a reference location of the registered graphical password is within an authentication margin, determines whether there has been an intrusion by referring to a graphical password input history stored in the storage unit 30 if the user is not authenticated based on the received graphical password, and can reduce the authentication margin if the control unit 20 determined that there has been an intrusion, in operations S302 through S312. In a case where, after the authentication margin is reduced, the determination that there has been an intrusion is considered as being cancellable by referring to the graphical password input history, the control unit 20 resets the reduced authentication margin.

Here, the reference location of the registered graphical password could be a predetermined area enclosed by edges rather than a specific point. In addition, in a case where two or more graphical passwords are adopted to authenticate the user, the control unit 20 determines whether to authenticate the user depending on whether the graphical passwords have been input in a predetermined order.

In operations S404 and S412, the storage unit 30 stores the graphical password input history. The control unit 20 determines whether there has been an intrusion by referring to the graphical password input history stored in the storage unit 30.

The control unit 20 also determines in operation S310 or S412 that there has been an intrusion if the graphical password has been input beyond a predetermined distance from the reference location of the registered graphical password.

In operation S414, the storage unit 30 stores an intruder's biometrics information if the control unit 20 determines that there has been an intrusion. The biometrics unit 40 determines whether to authenticate the user by comparing the user's biometrics information with the intruder's biometrics information stored in the storage unit 30.

The control unit 20 adjusts a variation range of the threshold value for biometrics in operation S416 using the graphical password input history if the user is not authenticated. More specifically, the control unit 20 adjusts the variation range of the threshold value for biometrics so as to enhance the level of security if a wrong graphical password has been input n times or more. In addition, the control unit 20 restores the varied variation range of the threshold value for biometrics if a correct graphical password has been input m times or more.

The display unit 60 displays a background picture on the screen of the terminal. The background picture displayed by the display unit 60 helps a user to locate a place where a graphical password is desired to be input.

The user authentication apparatuses according to the present invention may add/renew an authentication key in operations S408 and S410 if the user is authenticated by the biometrics unit 40. In order to add/renew the authentication key, the biometrics unit 40 outputs the user's biometrics to the storage unit 30 if the user is successfully authenticated. To increase reliability of the renewal of the authentication key, in particular, the biometrics unit 40 will add/renew the authentication key by outputting the user's biometrics to the storage unit 30 only when the received graphical password matches with the registered graphical password and the user is authenticated. In addition, the user authentication apparatuses according to the present invention may add/renew the authentication key only when the extent to which the received biometrics information (or the user's biometrics information) matches with the registered biometrics information is larger than a predetermined threshold value.

The user authentication methods according to the present invention, respectively illustrated in FIGS. 1 through 4, can be written into computer-executable programs and can be realized in a common digital computer with the help of a computer-readable recording medium. The computer-readable recording medium includes a ROM, magnetic storage medium, such as a floppy disk, or a hard disk, an optical storage medium, such as CD-ROM or a DVD, and a carrier wave, such as data transmission through the Internet.

As described above, according to the present invention, it is possible to improve convenience, reliability, and security of user authentication based on a graphical password in a portable electronic device, such as a PDA not having a key manipulation unit.

In addition, according to the present invention, it is possible to utilize a biometrics unit to carry out user authentication while lowering both FAR and FRR by variably setting a threshold value for biometrics depending on a result of user authentication using a graphical password.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A user authentication method that authenticates a user based on a graphical password input by the user, the user authentication method comprising:
   determining whether the graphical password has been input;
   determining whether to authenticate the user depending on whether the extent to which a location of the input graphical password matches with a reference location of a registered graphical password is within an authentication margin for a location of any input graphical password with respect to the reference location of the registered graphical password;
   storing a graphical password input history if the user is not authenticated;
   determining whether there has been an intrusion by referring to the graphical password input history; and
   reducing the authentication margin if determined that there has been an intrusion,
   wherein the graphical password comprises displaying a predetermined graphical image and requiring the user to select predetermined areas of the graphical image in a predetermined sequence.

2. The user authentication method of claim 1, wherein the reference location of the registered graphical password is a predetermined area.

3. The user authentication method of claim 1, wherein the determining whether to authenticate the user further comprises determining whether an order of received graphical passwords matches with an order of registered graphical passwords.

4. The user authentication method of claim 1, wherein the determining whether there has been an intrusion comprises referring to the graphical password input history and checking if a graphical password has been input beyond a predetermined distance from the reference location of the registered graphical password.

5. The user authentication method of claim 1, further comprising displaying a background picture on the screen of the terminal.

6. The user authentication method of claim 1, further comprising restoring the reduced authentication margin if the determination that there has been an intrusion is cancelable based on the graphical password input history.

7. A computer-readable recording medium on which a program enabling the user authentication method of claim 1 is recorded.

8. A user authentication method that authenticates a user based on biometrics information and a graphical password input by the user, the user authentication method comprising:
   determining whether the graphical password has been input;
   variably setting a threshold value of biometrics depending on the extent to which the input graphical password matches with a registered graphical password; and
   authenticating the user based on a result of comparing the user's biometrics information with registered biometrics using the set threshold biometrics value, wherein the graphical password comprises displaying a predetermined graphical image and requiring the user to select predetermined areas of the graphical image in a predetermined sequence.

9. The user authentication method of claim 8, wherein the variably setting the threshold value of biometrics comprises:
   determining whether to authenticate the user depending on the extent to which the input graphical password matches with the registered graphical password; and
   variably setting the threshold value of biometrics depending on the extent to which the input graphical password matches with the registered graphical password.

10. The user authentication method of claim 9, wherein the determining whether to authenticate the user comprises:
    determining whether to authenticate the user depending on whether the extent to which a location of the input graphical password matches with a reference location of the registered graphical password is within an authentication margin;
    storing a graphical password input history if the user is not authenticated based on the input graphical password;
    determining whether there has been an intrusion by referring to the graphical password input history; and
    reducing the authentication margin if determined that there has been an intrusion.

11. The user authentication method of claim 10, wherein the reference location of the registered graphical password is a predetermined area.

12. The user authentication method of claim 10, wherein the determining whether to authenticate the user further comprises, determining whether an order of received graphical passwords matches with an order of registered graphical passwords.

13. The user authentication method of claim 10, wherein the determining whether there has been an intrusion comprises checking if a graphical password has been input beyond a predetermined distance from the reference location of the registered graphical password.

14. The user authentication method of claim 10, further comprising:
    restoring the reduced authentication margin if the determination that there has been an intrusion is cancelable based on the graphical password input history.

15. The user authentication method of claim 8, further comprising displaying a background picture on the screen of the terminal.

16. The user authentication method of claim 8, further comprising:
    storing a graphical password input history; and
    determining whether there has been an intrusion by referring to the graphical password input history if the user is not authenticated.

17. The user authentication method of claim 16, further comprising:
    storing an intruder's biometrics if determined that there has been an intrusion, wherein the user is authenticated depending on a result of comparing the user's biometrics information with the stored intruder's biometrics information.

18. The user authentication method of claim 8, further comprising:
    storing a graphical password input history; and
    varying a variation range of the threshold value using the graphical password input history if the user is not authenticated.

19. The user authentication method of claim 18, wherein, the variation range of the threshold value is varied so as to increase the level of security if an incorrect graphical password has been input at least n times.

20. The user authentication method of claim 19, wherein the varying the variation range o the threshold value comprises restoring the varied variation range of the threshold value if the graphical password has been input m times or more correctly since the variation range of the threshold value was varied.

21. The user authentication method of claim 8, further comprising:
    adding/renewing an authentication key if the user is authenticated.

22. The user authentication method of claim 21, wherein, the authentication key is added/renewed only when the input graphical password matches with the registered graphical password and the user is authenticated.

23. The user authentication method of claim 21, wherein in step (h), the authentication key is added/renewed only when the user is authenticated and the extent to which the user's biometrics information matches with the registered biometrics information is larger than a predetermined threshold value.

24. A computer-readable recording medium on which a program enabling the user authentication method of claim 8 is recorded.

25. A user authentication apparatus that authenticates a user based on a graphical password input by the user, the user authentication apparatus comprising:
    a graphical password input unit which determines whether the graphical password has been input;
    a control unit which authenticates the user depending on whether the extent to which a location of the input graphical password matches with a reference location of a registered graphical password is within an authentication margin for a location of any input graphical password with respect to the reference location of the registered graphical password;
    a storage unit which stores the registered graphical password and stores a graphical password input history if the user is not authenticated; and
    a graphical password input history analysis unit which determines whether an intrusion occurred by referring to the graphical password input history,
    wherein the control unit reduces the authentication margin of the location of any input graphical password with respect to the reference location of the registered graphical password if the graphical password input history analysis unit determines that there has been an intrusion, and
    wherein the graphical password comprises a predetermined graphical image on a display where the user selects predetermined areas of the graphical image in a predetermined sequence.

26. The user authentication apparatus of claim 25, wherein the reference location of the registered graphical password is a predetermined area.

27. The user authentication apparatus of claim 25, wherein the control unit determines whether to authenticate the user depending on whether graphical passwords have been input in a right order.

28. The user authentication apparatus of claim 25, wherein the graphical password input history analysis unit determines that there has been an intrusion if a graphical password has been input beyond a predetermined distance from the reference location of the registered graphical password.

29. The user authentication apparatus of claim 25, further comprising a display unit which displays a background picture on the screen of the terminal.

30. The user authentication apparatus of claim 25, wherein the control unit resets the reduced authentication margin if the determination that there has been an intrusion is cancelable based on the graphical password input history.

31. A user authentication apparatus that authenticates a user based on biometrics information and a graphical password input by the user, the user authentication apparatus comprising:
   a graphical password input unit which determines whether the graphical password has been input;
   a storage unit which stores registered graphical password and registered biometrics information;
   a control unit which variably sets a threshold value of biometrics depending on the extent to which the input graphical password matches with the registered graphical password; and
   a biometrics unit which authenticates the user based on a result of comparing the user's biometrics information input from the outside with registered biometrics,
   wherein the graphical password comprises a predetermined graphical image on a display where the user selects predetermined areas of the graphical image in a predetermined sequence.

32. The user authentication apparatus of claim 31, wherein the control unit determines whether to authenticate the user, depending on the extent to which the input graphical password matches with the registered graphical password, and variably sets the threshold value for living body recognition, depending on the extent to which the input graphical password matches with the registered graphical password.

33. The user authentication apparatus of claim 32, wherein the control unit determines whether to authenticate the user, depending on whether the extent to which a location of the input graphical password matches with a reference location of the registered graphical password is within an authentication margin, determines whether there has been an intrusion by referring to the graphical password input history, and reduces the authentication margin if determined that there has been an intrusion, and the storage unit stores the graphical password input history if the user is not authenticated based on the input graphical password.

34. The user authentication apparatus of claim 33, wherein the reference location of the registered graphical password is a predetermined area.

35. The user authentication apparatus of claim 33, wherein the control unit determines whether to authenticate the user depending on whether an order of received graphical passwords matches with an order of registered graphical passwords.

36. The user authentication apparatus of claim 33, wherein the control unit determines that there has been an intrusion if the graphical password has been input beyond a predetermined distance from the reference location of the registered graphical password.

37. The user authentication apparatus of claim 33, wherein the control unit restores the reduced authentication margin if the determination that there has been an intrusion is considered as being cancelable based on the graphical password input history.

38. The user authentication apparatus of claim 31, further comprising a display unit which displays a background picture on the screen of the terminal.

39. The user authentication apparatus of claim 31, wherein the storage unit stores the graphical password input history, and the control unit determines whether there has been an intrusion by referring to the graphical password input history if the user is not authenticated.

40. The user authentication apparatus of claim 39, wherein the storage unit stores an intruder's biometrics if the graphical password input history analysis unit determines that there has been an intrusion, and the biometrics unit determines whether to authenticate the user depending on a result of comparing the user's biometrics information with the intruder's biometrics information stored in the storage unit.

41. The user authentication apparatus of claim 31, wherein the storage unit stores the graphical password input history, and the control unit varies a variation range of the threshold value using the graphical password input history if the user is not authenticated.

42. The user authentication apparatus of claim 41, wherein the control unit varies the variation range of the threshold value so as to increase the level of security if an incorrect graphical password has been input n times or more.

43. The user authentication apparatus of claim 42, wherein the control unit restores the varied variation range of the threshold value if a right graphical password has been input m times or more since the variation range of the threshold value was varied.

44. The user authentication apparatus of claim 31, wherein an authentication key is added/renewed if the user is authenticated by the biometrics unit.

45. The user authentication apparatus of claim 44, wherein the authentication key is added/renewed only when the user is authenticated by the biometrics unit and the input graphical password matches with the registered graphical password.

46. The user authentication apparatus of claim 44, wherein the authentication key is added/renewed only when the user is authenticated and the extent to which the user's biometrics information matches with the registered biometrics information is larger than a predetermined threshold value.

47. A user authentication method, comprising:
   comparing an input graphical password to a registered graphical password and outputting a valid result when the input graphical password is within a predetermined proximity window of the registered graphical password and outputting an invalid result when the input graphical password is outside the predetermined proximity window of the registered graphical password, wherein the user is authenticated when the valid result is output; and
   adjusting the predetermined proximity window, wherein the predetermined proximity window is decreased when the invalid result is output,
   wherein the graphical password comprises displaying a predetermined graphical image and requiring the user to select predetermined areas of the graphical image in a predetermined sequence.

48. The method of claim 47, further comprising:
   comparing the users input biometric information to registered biometric information using a predetermined threshold level which corresponds to a predetermined false acceptance rate and a predetermined false rejection rate.

49. The method of claim 48, wherein the predetermined threshold level is set so that the false rejection rate is reduced when the valid result is output and the false acceptance rate is reduced when the invalid result is output.

50. The method of claim 48, further comprising:

counting a number of invalid result outputs; and storing the user's biometric information as intruder biometric information when the number exceeds a predetermined intruder count level.

51. The method of claim 50, further comprising:

comparing the user's biometric information to the intruder biometric information and blocking the user when there is a match.

52. A user authentication apparatus, comprising:

a graphical password input unit which receives a graphical password input by a user, wherein a key manipulation unit is not used to input the graphical password;

a storage unit which stores registered graphical password and registered biometrics information corresponding to authorized users;

a control unit which variably sets a threshold biometrics value depending on the degree to which the input graphical password is proximate to the registered graphical password; and a biometrics unit which reads the user's biometrics information and authenticates the user based on a result of comparing the user's biometrics information with the registered biometrics using the set threshold biometrics value, wherein the graphical password comprises a predetermined graphical image on a display where the user selects predetermined areas of the graphical image in a predetermined sequence.

53. The apparatus of claim 52, wherein the control unit sets the threshold biometrics value to lower a false acceptance rate when the input graphical password is outside a predetermined proximity area of the registered graphical password and sets the threshold biometrics value to lower a false rejection rate when the input graphical password is within the predetermined proximity area of the registered graphical password.

* * * * *

UNITED STATES PATENT AND TRADEMARK OFFICE
CERTIFICATE OF CORRECTION

| | | |
|---|---|---|
| PATENT NO. | : 7,272,380 B2 | Page 1 of 1 |
| APPLICATION NO. | : 10/760555 | |
| DATED | : September 18, 2007 | |
| INVENTOR(S) | : Jong-ha Lee et al. | |

It is certified that error appears in the above-identified patent and that said Letters Patent is hereby corrected as shown below:

Column 14, Line 4, after "range", change "o" to --of--.

Signed and Sealed this

Fourth Day of March, 2008

JON W. DUDAS
*Director of the United States Patent and Trademark Office*